INVENTORS:
SAM S. TROMBATORE
WILLIAM J. GRISWOLD

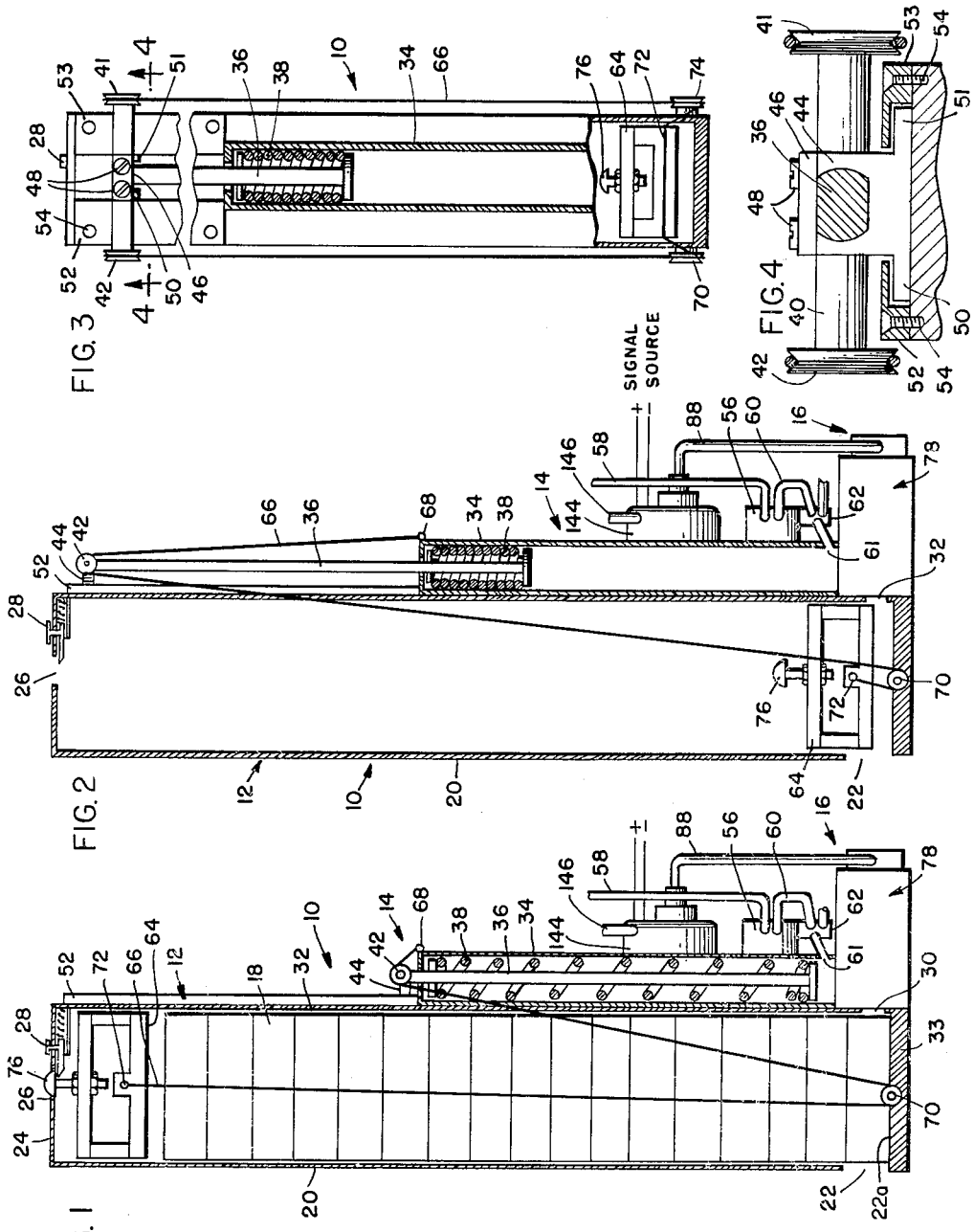

Nov. 9, 1965  S. S. TROMBATORE ETAL  3,216,410

EJECTOR MECHANISM

Filed Sept. 11, 1961  3 Sheets-Sheet 3

INVENTORS:
SAM S. TROMBATORE
WILLIAM J. GRISWOLD
BY
ATT'Y

United States Patent Office 3,216,410
Patented Nov. 9, 1965

3,216,410
EJECTOR MECHANISM
Sam S. Trombatore, Chicago, and William J. Griswold, Oak Lawn, Ill., assignors to Webcor, Inc., Chicago, Ill., a corporation of Illinois
Filed Sept. 11, 1961, Ser. No. 137,266
9 Claims. (Cl. 124—11)

This invention relates in general to ejectors and in particular to an automatic gas operated ejector mechanism which rapidly ejects objects from a vehicle.

Recent developments in detection equipment and systems throughout the world for aircraft have led to the development of several counter detection devices. Referring primarily to the radar controlled systems, it has been found that metallic objects in the air, such as tin foil, will register on a radar screen in similar manner as will an aircraft. Consequently, several devices and systems have been devised and utilized to eject packages of tin foil, often referred to as chaffe, from the aircraft to counter or jam radar detection equipment.

Another defensive measure that has been developed to counter the speed and effectiveness of today's modern jet propelled aircrafts has been the missiles which are often referred to as "heat seekers" in that they are guided into explosive contact with the aircraft by the heat generated from the jet engines. To divert the flight of these missiles from the aircraft, it has been found effective to dispense a plurality of infrared packages, detonated as they leave the aircraft, which generate a higher value of heat then the aircraft engine, thus diverting the missile towards one of these burning packages. It is to these counter detection or defensive problems that the present invention is directed.

It is therefore, the primary object of this invention to provide an ejector mechanism to efficiently and rapidly dispense counter detection and defensive material from a vehicle.

It is a specific object of this invention to provide an improved ejector mechanism which automatically and rapidly ejects packages of material at variable intervals from an aircraft.

Another object of this invention is to provide an improved automatic, gas operated ejector mechanism having novel means for continuous positive feeding of the packages of counter detection material to an ejection port in coordination with an ejection valve to eject the individual packages from an aircraft.

Another object of this invention is to provide an improved gas operated automatic ejector mechanism having a novel ejector valve in which a portion of the valve mechanically initiates the movement of the package of counter detection material with a surge of gas under pressure subsequently ejecting the moving package from the aircraft.

A still further object of this invention is to provide a durable, efficient, light weight, automatic, gas operated ejector mechanism which is simple and easy to manufacture at a reasonable cost, and adaptable to be mounted in existing aircraft without appreciable aircraft structural changes.

With these objects and other features and advantages of the invention in mind, which will appear from the following description and claims taken in connection with the drawings, the invention consists in the novel construction, arrangement and formation of the parts wherein:

FIG. 1 is a partially sectioned view in side elevation illustrating the relationship of the component parts of the ejector mechanism of this invention with a follower member in the upper position;

FIG. 2 is a partially sectioned view in side elevation similar to that illustrated in FIG. 1 with the follower member in the lower position;

FIG. 3 is a fragmentary partially sectioned cut away view in rear elevation illustrating the relationship of the actuating pulley and cable arrangement for the follower member;

FIG. 4 is a fragmentary partially sectioned view taken along the line 4—4 of FIG. 3;

Figure 5:
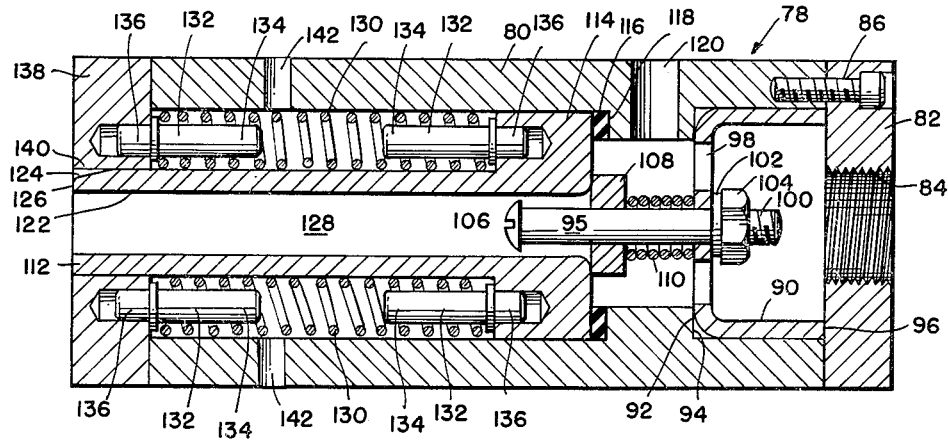
FIG. 5 is a cross sectional view in side elevation illustrating the ejector valve of this invention in the normally closed position.

Referring now to FIGS. 1, 2 and 3, the ejector mechanism of this invention is generally indicated by the numeral 10 and consists of three main sections; a housing section 12, a material supply section 14 and an ejection section 16.

*Housing section*

The housing section 12 forms a rectangular compartment for receipt of a plurality of packages 18 with an ejection chamber 22a at the bottom thereof for the bottom package, containing the counter detection material, in stacked relationship as shown in FIG. 1. The housing is preferably formed from a light weight metal, such as aluminum, with the side walls substantially open with only sufficient side wall to maintain the packages in guided relationship at all times.

A forward wall 20 of the housing section 12 provides an ejection opening 22 adjacent the lower end thereof sufficiently large to pass a package 18. It being understood that the ejector mechanism of this invention is mounted adjacent the wall or surface structure of an aircraft and as the package passes through the opening 22 it ejects outside the aircraft.

An upper wall 24 of the housing section 12 provides a centrally disposed opening 26 for passage therethrough of a locking tab detachably secured to a reciprocating follower member to be explained. A spring loaded locking mechanism 28 is slidably mounted in the upper wall 24 to engage and hold the locking tab.

An opening 30 is centrally formed through the rear wall 32 of the housing section 12 adjacent the lower end thereof directly opposite the opening 22 in the forward wall 20. The opening 30 serves as an inlet port to the housing from the ejector section 16, to be explained.

A bottom wall 33 of the housing section 12, being substantially greater in cross section than the side walls of the housing, provides one wall of the ejection chamber for the lowermost package. The upper wall of the ejection chamber is formed by the lower or bottom surface of the package directly above the lowermost package resting on the bottom wall 33. Thus, as seen in FIG. 1 and as will be readily understood as the description continues, the lowermost package 18 is subjected to an ejection force through the opening 30 in the rear wall 32 and free to pass through the opening 22 in the forward wall 20.

*Material supply section*

Still referring to FIGS. 1, 2, 3 and 4, the material supply section 14 provides a piston 34, centrally secured to the rear wall 32 of the housing section 12, having a reciprocal plunger 36 resiliently retained in the closed or downward position by a coil spring 38 as shown in FIG. 1. Detachably secured to the upper end of plunger 36 is a crossbar 40 having a pulley 41 and 42 rotatably retained on each end thereof as seen in FIG. 4. The crossbar 40 is secured to the end of the plunger 36 by a T-shaped bracket 44 designed to be positioned over the plunger and secured in place by a plate 46 and hold-down screws 48. The T-shaped bracket 44 provides outwardly extending arms 50 and 51 which are slidably retained under guide brackets 52 and 53 which are secured to the rear wall 30 and extend the length of the housing from a point adjacent the top portion of piston 34 to the upper portion of the housing 12. The guide brackets 52 and 53 may be secured by any suitable means and are shown in the drawings as by a plurality of holding screws 54. Thus, it is seen, that as the plunger 36 reciprocates in the piston 34, the extended end of the plunger is maintained in concentric alignment at all times with the piston by the guiding action of the arms 50 and 51 being retained in sliding relationship under the guide brackets 52 and 53.

The piston 34 is actuated by gas under pressure supplied from a regulator 56. The regulator 56 has a high pressure gas inlet line 58 that connects to a suitable supply source (not shown) and a discharge line 60 which connects to the piston through an aperture 61 in the lower portion of the piston 34. Mounted in the discharge line 60, between the regulator 56 and the inlet aperture 61, is a bleed valve 62. In operation, the high pressure gas is emitted to the regulator 56, the bleed valve 62 is moved to the closed position, the regulator is actuated to permit passage of the desired gas pressure to the piston 34 which in turn will raise the plunger 36. To lower the piston, the regulator 56 is actuated to shut off the flow of gas and the bleed valve 62 is opened to exhaust the trapped gas to atmosphere, permitting the spring 38 and the weight of the plunger to return the plunger to its normally downward or closed position. The regulator 56 and bleed valve 62 may be remotely actuated if desired by use of solenoid actuated valves with adequate instrumentation provided to clearly indicate applied pressures and operating positions.

Mounted within the housing section 12 is a follower 64, coordinated for reciprocal movement therein with the piston 34. The follower 64, having a rectangular configuration substantially the size of the packages 18, is interconnected to the piston 34 by a cable member 66, preferably formed from high tensile steel. The follower 64 provides a constant downward or transverse force on the stack of packages 18 as the piston 34 is actuated and moved in the upper direction. The coordinated movement of the follower is accomplished by securing an end 68 of cable 66 to the upper portion of the housing of piston 34, passing the cable over pulley 42, secured to the plunger 36, downwardly under a pulley 70 pivotally secured to the bottom wall 33 of the housing section 12, upwardly through an opening 72 passing transversally through the follower 64, downwardly under a pulley 74 pivotally secured on the bottom wall 33 directly opposite the pulley 70, upwardly over pulley 41, pivotally secured opposite the pulley 42, with the free end of the cable, not shown in the drawings, secured to the housing of the piston 34 in the same manner as the other cable end 68.

It is readily understood from the description above and a comparison of FIGS. 1 and 2, that the cable and pulley arrangement interconnecting the follower 64 with the plunger 36 of piston 34 provides a 2 to 1 ratio whereby a 1″ movement upwardly of plunger 36 will result in a 2″ downward movement of the follower 64.

The transverse force applied to the packages 18 by the follower 64 will continually force the packages downward into the ejection position at the bottom of the housing section 12. The applied transverse force eliminates any possibility of jamming of the packages within the housing plus it holds all of the packages above the package about to be ejected from rising upwardly under the force of gas pressure utilized to eject the bottom most package out of the vehicle.

A locking tab 76, previously referred to, is centrally secured on top of the follower 64 in juxtaposition for engagement with the opening 26 and locking mechanism 28 in the upper wall of the housing section 12.

When the piston 34 is in the downward or closed position, as shown in FIG. 1, the follower 64 may be raised by hand until the locking mechanism 28 engages and holds the locking tabs 76. A plurality of packages 18, of desired material, may be readily inserted into the housing section 12, the follower 64 released by actuation of locking mechanism 28 whereby the follower will engage the uppermost package ready for operation.

*Ejection section*

An air ejection valve 78, secured to the housing section 12 in alignment with the opening 30 in the rear wall 32, provides the motivating force to eject the packages at variable intervals from the vehicle.

Referring now more specifically to FIGS. 5, 6, 7 and 8, the ejection valve 78 provides a substantially rectangular hollow housing 80, preferably formed from a light weight metal such as aluminum capable of withstanding pressures up to 250 p.s.i. An end cap member 82, having a centrally disposed threaded aperture 84 therethrough, is detachably secured in sealing relationship to the housing 80 by a plurality of hold down screws 86 equally spaced about the periphery thereof. The aperture 84 serves as a compressed gas inlet aperture receives a standard threaded coupling member to which is connected a high pressure gas inlet line 88 as best seen in FIGS. 1 and 2.

A spacer member 90 is rigidly secured in the housing 80 beneath the cap member 82 with a bottom wall 92 thereof seating on a shoulder 94, formed by a reduction of the cross section area of the opening passing through the housing, with the upper end 96 of the spacer member 90 in contact with the under surface of cap 82. The spacer 90, substantially U-shaped in configuration, provides a plurality of openings 98 in the bottom wall 92 for passage therethrough of the gas pressure from the inlet aperture 84.

Figure 7:
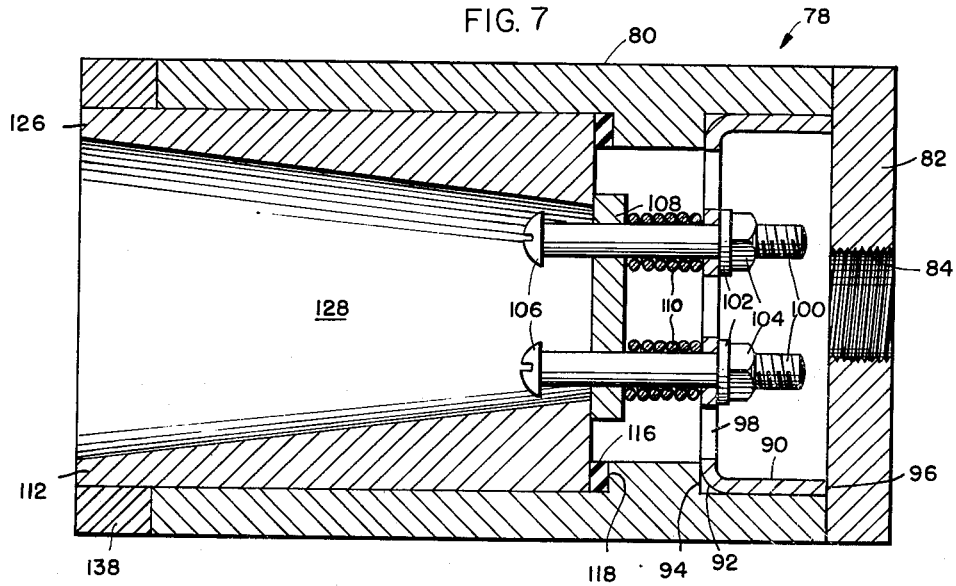
FIG. 7 is a cross sectional view in plan elevation of the ejector valve in the normally closed position.
Figure 8:
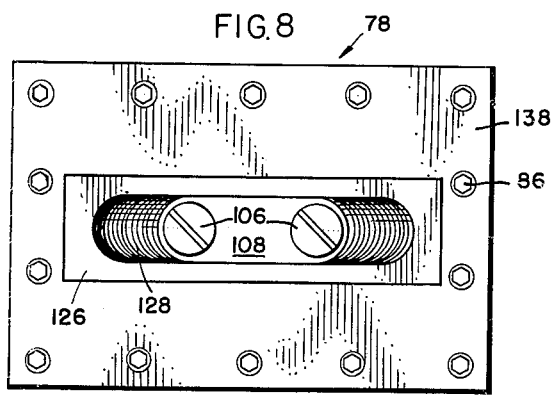
FIG. 8 is an end view of the ejector valve of this invention.

A pair of slide shafts 95, extending inwardly into the housing 80, provides threaded end portions 100 received through the bottom wall 92 of the spacer 90 and securely held in place by lock washers 102 and nut members 104 as best seen in FIG. 7. The other end of the slide shafts 95, provide a head or enlarged stop portion 106 which limits the inward travel of a slide plug 108. The slide plug 108, preferably formed from anodized aluminum, is free to reciprocate on the slide shafts 95 and is continually urged toward the head portions 106 by compression springs 110. Each of the springs 110 is disposed about a slide shaft 95 between the under surface of the spacer 90 and the upper surface of the slide plug 108.

Mounted in sliding relationship in the other end of the housing 80 is a slide piston 112 having an enlarged inner end 114 which seats in sealing relationship with a resilient seal ring 116 when valve 76 is in the normally closed position as illustrated in FIG. 4. The seal ring 116 seats in sealing relationship on a shoulder 118 formed by an increase in the cross sectional area of the passage through the housing 80.

An aperture 120 is formed through the thicker side wall of the housing 80 between the shoulders 94 and 118 to which safety relief valves (not shown) may be connected to relieve any excessive build up of gas pressure within the housing 80.

The slide piston 112 provides an elongated thin forward portion 122 integrally formed with the enlarged inner end 114. An upper surface 124, adjacent the outer extremity 126 of the forward portion 122 is angularly contoured in a downward direction to aid in controlling the downward movement of the packages 18 as will be explained.

An air flow passage 128, having converging side walls, as seen in FIG. 7, extends throughout the length of the slide piston 112 and is sealed at its inner end by the slide plug 108 when the valve is in the normally closed position and permits the flow of gas therethrough to eject the packages 18, as will be explained, when the valve is in the open position.

Figure 6:
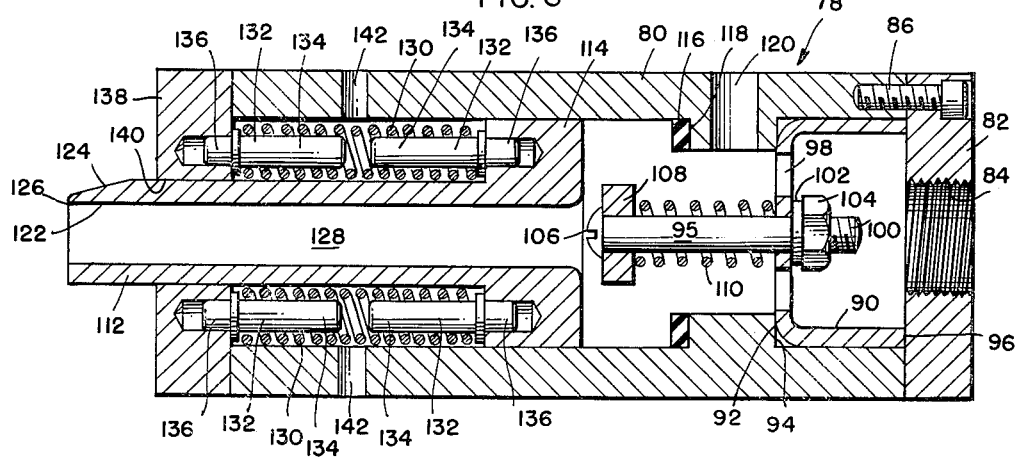
FIG. 6 is a cross sectional view in side elevation illustrating the ejector valve of this invention in the opened or ejecting position.

The slide piston 112 is held in the normally closed position by a plurality of compression springs 130 disposed within the housing 80 above and below the elongated forward portion 122 thereof. Each of the springs 130 are retained in position by spring guides 132 designed to have one end 134 received within the end of the springs with the other end 136 retained in the enlarged portion 114 of the slide piston 112 and at the other end of the spring the guide end 136 is retained in an end closing cap 138. The end closing cap 138 is secured in sealing relationship to the housing 80 by a plurality of hold down screws similar to screws 86 that retain the cap 82 on the other end of the housing. An aperture 140, centrally formed through the cap 138 and having a configuration and size substantially greater than that of the elongated forward end portion 122 of the slide piston 112, permits movement of the slide piston therethrough as seen in FIG. 6.

Apertures 142, formed in the upper and lower walls of the forward portion of the housing 80, vents the chambers housing the compression springs 130 to atmosphere to eliminate any build up of pressure to resist the movement of the slide piston 112 to the open position.

Referring now to FIGS. 1 and 2, the air ejection valve 78, just described, is controlled by a pilot valve 144 actuated by a variable signal source (not shown). As seen in FIGS. 1 and 2, a high pressure inlet line 146, connected to a supply source (not shown), supplies gas to the pilot valve 144 with the line 88 interconnecting the discharge from the pilot valve to the inlet of the ejection valve 78.

Having described in detail the component parts of the ejection mechanism of this invention and the operation of the package feed section 14 for the transfer of packages 18 to a position for ejection from the vehicle, the following description is directed to the overall operation of the mechanism and in particular to the operation of the ejection valve 78.

*Operation*

With the desired type of counter detection packages 18 positioned in the housing 12, as previously recited, gas pressure is applied through the inlet line 58 to the regulator 56 and properly adjusted for passage of gas pressure to the piston 34. At the same time, gas pressure is applied to the pilot valve 144 through inlet line 146. Upon actuation of the signal source of millisecond duration, the pilot valve 144 will move to the open position permitting gas pressure to pass through the line 88 into the ejection valve 78. Referring now primarily to FIGS. 5, 6 and 7, the incoming gas passes through the openings 98 in spacer 90 and acts on the exposed surface of the enlarged portion 114 of the slide piston 112 and on the upper surface of the slide plug 108. As the gas pressure moves the slide piston 112, the slide plug 108, due to the gas pressure on the top surface thereof and the force of the compression springs 110, will also move inwardly along the slide shafts 95. At the same time, the end 126 of the slide piston 112 will engage the rear wall of the lowermost package 18 and move it in an outwardly direction through the opening 22 in the housing 20. As the slide piston 112 moves outwardly, the compression springs 130 will be compressed and resist the movement of the slide piston. The slide plug 108 is arrested in movement as it reaches the heads 106 of the slide shafts 95, but the slide piston 112 continues moving outwardly permitting the gas to pass through the now open passage 128 and act on the rear wall of the already moving package 18 to eject the package from the vehicle.

As the gas enters the passage way 128, the pilot valve 144 is actuated shutting off the inlet flow of gas to the valve 76. The inertia of the slide piston 112 will carry it outwardly until the pressure of the gas has acted on the rear wall of the package 18 and ejects it from the vehicle.

The compressive force created as the gas pressure acts on the rear wall of the ejecting package 18 not only ejects the package, but combines with the force of springs 130 to drive the slide piston rearwardly to its normally closed position.

As the slide piston 112 moves rearwardly to its normally closed position, the package 18 above the one just ejected will be forced in a downwardly direction by the follower or platen 64 due to the movement of the piston 34. As this next package 18 commences its downward movement, it will contact the rearwardly moving slide piston 112 with the tapered upper surface 124 of the slide piston 112 aiding in guiding the downwardly moving package 18 into proper position to be ejected.

As the slide piston 112 moves towards the closed position, the gas trapped behind the enlarged inner end 114 will escape back through the pilot valve 144 exhaust port (not shown) which opens upon closing of the pilot valve inlet port. By utilizing the mechanical start of the package 18 through the action of the slide valve 112 as it moves outwardly, the static frictional forces between the package to be ejected and the bottom wall of the housing 12 and the package directly above has been broken permitting the incoming gas through the passage 128 to immediately eject the package without the normally experienced time delay for pressure build to overcome the static friction. The utilization of the compressive force ejecting the package to also force the slide valve 112 to its normally closed position, permits a faster overall operation of the ejection mechanism.

Thus, it is seen that the automatic, gas operated ejector mechanism of this invention provides the desired rapid ejection of the counter detection packages at a substantially lower pressure of the ejecting gas since the package is already moving when contacted by the gas, requires less volume of gas to eject a package, increases the rate of ejection of the packages and automatically locates the next package to be ejected.

Although a preferred embodiment of the invention has been shown and described herein, it will be apparent to those skilled in the art that various and further uses, modifications and changes may be made without departing from the spirit and substance of the invention, the scope of which is commensurate with the appended claims.

What is claimed is:

1. For use in ejecting packages of counter detection material from aircraft, an ejector mechanism including a package ejection chamber having an ejection opening on one side and an inlet port on the opposite side, a gas operated valve assembly comprising a housing defining an elongated passage having one end terminating at said inlet port and the other end having a compressed gas inlet aperture, a slide piston slidably received in said passage adjacent the inlet port, said slide piston providing an inner enlarged end portion and an elongated thin outer portion to reciprocate through said inlet port, a flow passage extending through the slide piston, means to seal said flow passage when the slide piston is in the closed position, said means and slide piston moving towards the ejection opening in unison as gas from said gas inlet aperture acts on the surfaces thereof, further means for arresting the movement of said means to seal toward the ejection opening end opening the flow passage as said thin outer portion of the slide piston continues movement through the inlet port imparting initial velocity to a package in the ejection chamber, said gas flowing through the now open flow passage creating a compressive force to impart terminal velocity to the package to eject it outwardly through said ejection opening.

2. For use in combination with an ejector mechanism in an aircraft for ejecting packages of counter detection material from an ejection chamber having an inlet port, a valve assembly comprising a housing defining an elongated passage one end terminating at said inlet port and the other end at a compressed gas inlet aperture, a spacer member disposed within the housing adjacent to the gas inlet aperture, a slide shaft slidably secured to said spacer member extending inwardly into the housing, a slide plug slidably received on said slide shaft, a slide piston slidably disposed in said elongated passage adjacent the inlet port, said slide piston providing an inner enlarged end portion and an elongated thin outer portion to reciprocate through said inlet port, a flow passage extending through the slide piston, said slide shaft extending into said flow passage with said slide plug engaging the enlarged inner end of the slide piston sealing off said flow passage therethrough when the slide piston is in its resting position, said slide plug and slide piston moving towards the inlet port in unison as the gas from said inlet aperture acts on the surfaces thereof, said slide piston engaging and moving a package in the ejection chamber as it extends through the inlet port, means arresting movement of the slide plug to open the flow passage as said slide piston continues movement through the inlet port, said gas flowing through the flow passage creating a compressive force against the moving package to eject it outwardly from the ejection chamber.

3. The combination called for in claim 2 wherein said flow passage provides side walls converging towards said slide plug.

4. For use in combination with an ejector mechanism for ejecting packages of counter detection material from an ejection chamber in an aircraft, a valve assembly comprising a housing defining an elongated passage one end terminating at an inlet port for the ejection chamber and the other end an inlet aperture for compressed gas, a spacer member disposed within the housing adjacent the inlet aperture, a slide shaft slidably secured to said spacer member extending inwardly into the housing, said slide shaft having an enlarged stop head on the extending end thereof, a slide plug slidably received on said slide shaft, bias means urging said slide plug towards the stop head, a slide piston slidably disposed in said passage adjacent the outlet opening, said slide piston providing an inner enlarged end portion and an elongated thin outer portion to reciprocate through said inlet port, a flow passage extending through the slide piston, bias means urging the slide piston inwardly away from said inlet port, the stop head on said slide shaft extending into said flow passage with said slide plug engaging the enlarged inner end of the slide piston to seal off said flow passage therethrough when the slide piston is in its resting position, said slide plug and slide piston moving towards the inlet port in unison as gas under pressure from said inlet aperture acts on the surfaces thereof, said slide plug being arrested in movement by the stop head to open the flow passage to the gas under pressure as said slide piston continues movement through the inlet port imparting velocity to a package in said ejection chamber, said gas expanding through the flow passage engaging the moving package and creating a force behind it to eject it outwardly from the ejection chamber and a counterforce to return said piston to its closed position.

5. For use in combination with an ejector mechanism for ejecting packages of counter detection material from aircrafts, a valve assembly for ejecting the packages from an ejection chamber in an aircraft comprising a housing defining an elongated passage one end defining an inlet port and the other end an inlet aperture for gas under pressure, a perforated spacer member securely disposed within the housing adjacent the inlet opening, a pair of spaced apart slide shafts slidably secured to said spacer member extending into the housing towards the inlet port, said slide shafts having an enlarged stop head on the extending ends thereof, a slide plug slidably received on said slide shafts, a compression spring encircling each of said slide shafts urging the slide plug towards the stop head, a slide piston slidably disposed in said passage adjacent the inlet port, said slide piston providing an inner enlarged end portion and an elongated thin outer portion to reciprocate through said inlet port, a flow passage extending centrally through the slide piston, a plurality of compression springs disposed above and below said outer portion of the slide piston urging the slide piston to a resting position inwardly away from said inlet port, the heads of said slide shafts extending into said flow passage with said slide plug engaging the enlarged inner end of the slide piston sealing off said flow passage therethrough when said slide piston is in its resting position, said slide plug and slide piston being moved towards the inlet port in unison as the gas from said inlet opening acts on the surfaces thereof, the end of said outer portion of the slide piston engaging a package to start movement thereof out of the ejector chamber, said slide plug being arrested in its movement by the stop heads to open the flow passage to gas under pressure as said slide piston continues movement through said inlet port for the gas to flow through the flow passage and engage the moving package to impart thereto a terminal velocity outwardly from the ejector chamber.

6. An automatic package ejector mechanism comprising an ejection chamber for receiving a package to be ejected and having in opposing side walls of the ejection chamber an ejection opening and an inlet port for gas under pressure, a valve assembly secured in juxtaposition with said inlet port and including a housing having an elongated passage in communication with said inlet port at one end and receiving gas under pressure through an inlet aperture at the other end, a slide piston movable in said elongated passage towards said ejection opening and having a flow passage therethrough in communication at one end with said inlet port, valve means disposed between said inlet aperture and flow passage and movable with said slide piston for closing said flow passage, means carried by said slide piston for engaging a package in said chamber through said inlet port upon ejection movement of the slide piston to initiate movement of the package into said ejection opening, and means for opening said valve means upon further ejection movement of the slide piston to release through said flow passage and inlet port an expanding gas under pressure against said package to impart thereto a terminal velocity ejecting it from the ejection chamber through the ejection opening.

7. For use in combination with an ejector mechanism for ejecting packages of counter detection material from an ejection chamber, a gas operated valve assembly comprising a housing having an inlet aperture at one end and a port at the other end juxtaposed in communication with said chamber, valve means disposed in said housing including a slidably mounted piston having a flow passage extending therethrough, an elongated forward end portion to reciprocate through said outlet port and a slide plug movable with the slide piston and normally engaging said piston to close said flow passage, means for applying gas under pressure against said slide piston and slide plug to force said forward end portion through the outlet port to impart initial velocity to a package in the ejection chamber, and means carried by said housing for restraining said slide plug to allow said gas under pressure to flow through the flow passage and impart terminal velocity to the package to eject it from said chamber.

8. The combination called for in claim 7 wherein said flow passage provides side walls converging towards said slide plug.

9. An automatic ejector mechanism for rapidly ejecting packages from a vehicle comprising a compartment carried by the vehicle having a plurality of packages retained therein, an ejection opening and an inlet port formed in opposing side walls of said compartment upon opposite sides of one of the packages in the compartment, a valve assembly secured in juxtaposition with said inlet port including two valve elements normally engaging each other to close said inlet port, both of said elements being movable by fluid under pressure a predetermined distance with one of the elements having a passage therethrough and engaging and imparting initial movement to said one of said packages to start it moving towards said ejection opening, and the other of said elements comprising a restraining shaft member extending into said passage and a plug closing said passage slidably mounted on the shaft to follow said one element a limited distance of movement thereof, an electrical signal controlled valve to apply fluid under pressure to said elements to actuate them in their movement, and means disengaging the two elements at said predetermined distance to apply the fluid under pressure against said one package to eject it through the ejection opening and from the vehicle.

References Cited by the Examiner

UNITED STATES PATENTS

| | | |
|---|---|---|
| 475,281 | 5/92 | Latimer. |
| 2,860,620 | 2/56 | Effinger. |
| 2,881,752 | 4/59 | Blahnik. |
| 3,040,727 | 6/62 | Edwards et al. _____ 124—11 |

RICHARD C. PINKHAM, *Primary Examiner.*

EVON C. BLUNK, LOUIS R. PRINCE, *Examiners.*